United States Patent
Zhuang et al.

(10) Patent No.: US 11,694,311 B2
(45) Date of Patent: Jul. 4, 2023

(54) JOINT ROLLING SHUTTER IMAGE STITCHING AND RECTIFICATION

(71) Applicant: NEC Laboratories America, Inc., Princeton, NJ (US)

(72) Inventors: Bingbing Zhuang, San Jose, CA (US); Quoc-Huy Tran, Santa Clara, CA (US)

(73) Assignee: NEC Corporation

( * ) Notice: Subject to any disclaimer, the term of this patent is extended or adjusted under 35 U.S.C. 154(b) by 318 days.

(21) Appl. No.: 17/182,836

(22) Filed: Feb. 23, 2021

(65) Prior Publication Data

US 2021/0279843 A1    Sep. 9, 2021

Related U.S. Application Data

(60) Provisional application No. 62/984,896, filed on Mar. 4, 2020.

(51) Int. Cl.
*G06T 5/00* (2006.01)
*G06T 7/20* (2017.01)
*H04N 23/68* (2023.01)

(52) U.S. Cl.
CPC ............... *G06T 5/003* (2013.01); *G06T 7/20* (2013.01); *H04N 23/689* (2023.01)

(58) Field of Classification Search
None
See application file for complete search history.

(56) References Cited

U.S. PATENT DOCUMENTS

| | | | | |
|---|---|---|---|---|
| 9,374,532 B2* | 6/2016 | Grundmann | ........... | G06V 20/46 |
| 9,852,512 B2* | 12/2017 | Gonzalez-Banos | ....... | G06T 7/20 |
| 9,888,179 B1* | 2/2018 | Liang | ................... | H04N 23/683 |
| 10,027,893 B2* | 7/2018 | Bell | ...................... | H04N 23/689 |
| 2008/0225127 A1* | 9/2008 | Ming | .................. | H04N 5/2628 |
| | | | | 348/208.99 |

(Continued)

OTHER PUBLICATIONS

Lao et al., "Rolling Shutter Homography and its Applications", IEEE transactions on pattern analysis and machine intelligence. Mar. 2, 2020. pp. 1-15.

(Continued)

*Primary Examiner* — James M Hannett
(74) *Attorney, Agent, or Firm* — Joseph Kolodka

(57) ABSTRACT

A computer-implemented method executed by at least one processor for applying rolling shutter (RS)-aware spatially varying differential homography fields for simultaneous RS distortion removal and image stitching is presented. The method includes inputting two consecutive frames including RS distortions from a video stream, performing keypoint detection and matching to extract correspondences between the two consecutive frames, feeding the correspondences between the two consecutive frames into an RS-aware differential homography estimation component to filter out outlier correspondences, sending inlier correspondences to an RS-aware spatially varying differential homography field estimation component to compute an RS-aware spatially varying differential homography field, and using the RS-aware spatially varying differential homography field in an RS stitching and correction component to produce stitched images with removal of the RS distortions.

20 Claims, 4 Drawing Sheets

(56) References Cited

U.S. PATENT DOCUMENTS

| | | | |
|---|---|---|---|
| 2012/0038549 A1* | 2/2012 | Mandella | G06F 3/011 |
| | | | 345/156 |
| 2014/0160309 A1* | 6/2014 | Karpenko | H04N 23/683 |
| | | | 348/208.6 |
| 2017/0032503 A1 | 2/2017 | Raichman et al. | |
| 2019/0104255 A1* | 4/2019 | Shi | H04N 23/6811 |

OTHER PUBLICATIONS

Zaragoza et al., "As-Projective-as-Possible Image Stitching with Moving DLT", Proceedings of the IEEE conference on computer vision and pattern recognition. Jun. 23-28, 2013. pp. 2339-2346.

Zhuang et al., "Learning Structure-and-Motion-Aware Rolling Shutter Correction", Proceedings of the IEEE/CVF Conference on Computer Vision and Pattern Recognition. Jun. 16-20, 2019. pp. 1-10.

Zhuang et al., "Rolling-Shutter-Aware Differential SfM and Image Rectification", Proceedings of the IEEE International Conference on Computer Vision. Oct. 22-29, 2017. pp. 1-9.

Yizhen Lao et al., "Rolling Shutter Homography and its Applications", IEEE Transactions on Pattern Analysis and Machine Intellgience (Early Access), Mar. 2, 2020, pp. 1-3, 5,7,9.

* cited by examiner

JOINT ROLLING SHUTTER IMAGE STITCHING AND RECTIFICATION

RELATED APPLICATION INFORMATION

This application claims priority to Provisional Application No. 62/984,896, filed on Mar. 4, 2020, incorporated herein by reference in its entirety.

BACKGROUND

Technical Field

The present invention relates to complementary metal oxide semiconductor (CMOS) imaging sensors and, more particularly, to joint rolling shutter image stitching and rectification related to CMOS imaging sensors.

Description of the Related Art

Many hand-held and wearable devices such as mobile phones, tablets, web cameras, drones, and smart glasses employ complementary metal oxide semiconductor (CMOS) imaging sensors due to their simple design and low-cost advantages. However, CMOS imaging sensors usually come with the drawback of capturing images under the Rolling Shutter (RS) mechanism. In contrast to Global Shutter (GS), which exposes all rows of the sensor array generally at the same time, RS exposes the sensor array on a row-by-row basis from top to bottom with a constant inter-row time delay. Therefore, if an RS camera is moving during image capturing, the produced RS images may include distortions such as skews and wobbles due to the delay between the exposure of the first row and last row.

SUMMARY

A computer-implemented method executed by at least one processor for applying rolling shutter (RS)-aware spatially varying differential homography fields for simultaneous RS distortion removal and image stitching is presented. The method includes inputting two consecutive frames including RS distortions from a video stream, performing keypoint detection and matching to extract correspondences between the two consecutive frames, feeding the correspondences between the two consecutive frames into an RS-aware differential homography estimation component to filter out outlier correspondences, sending inlier correspondences to an RS-aware spatially varying differential homography field estimation component to compute an RS-aware spatially varying differential homography field, and using the RS-aware spatially varying differential homography field in an RS stitching and correction component to produce stitched images with removal of the RS distortions.

A system for applying rolling shutter (RS)-aware spatially varying differential homography fields for simultaneous RS distortion removal and image stitching is also presented. The system includes a memory and a processor in communication with the memory, wherein the processor is configured to input two consecutive frames including RS distortions from a video stream, perform keypoint detection and matching to extract correspondences between the two consecutive frames, feed the correspondences between the two consecutive frames into an RS-aware differential homography estimation component to filter out outlier correspondences, send inlier correspondences to an RS-aware spatially varying differential homography field estimation component to compute an RS-aware spatially varying differential homography field, and use the RS-aware spatially varying differential homography field in an RS stitching and correction component to produce stitched images with removal of the RS distortions.

A non-transitory computer-readable storage medium comprising a computer-readable program is presented for applying rolling shutter (RS)-aware spatially varying differential homography fields for simultaneous RS distortion removal and image stitching, wherein the computer-readable program when executed on a computer causes the computer to perform the steps of inputting two consecutive frames including RS distortions from a video stream, performing keypoint detection and matching to extract correspondences between the two consecutive frames, feeding the correspondences between the two consecutive frames into an RS-aware differential homography estimation component to filter out outlier correspondences, sending inlier correspondences to an RS-aware spatially varying differential homography field estimation component to compute an RS-aware spatially varying differential homography field, and using the RS-aware spatially varying differential homography field in an RS stitching and correction component to produce stitched images with removal of the RS distortions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
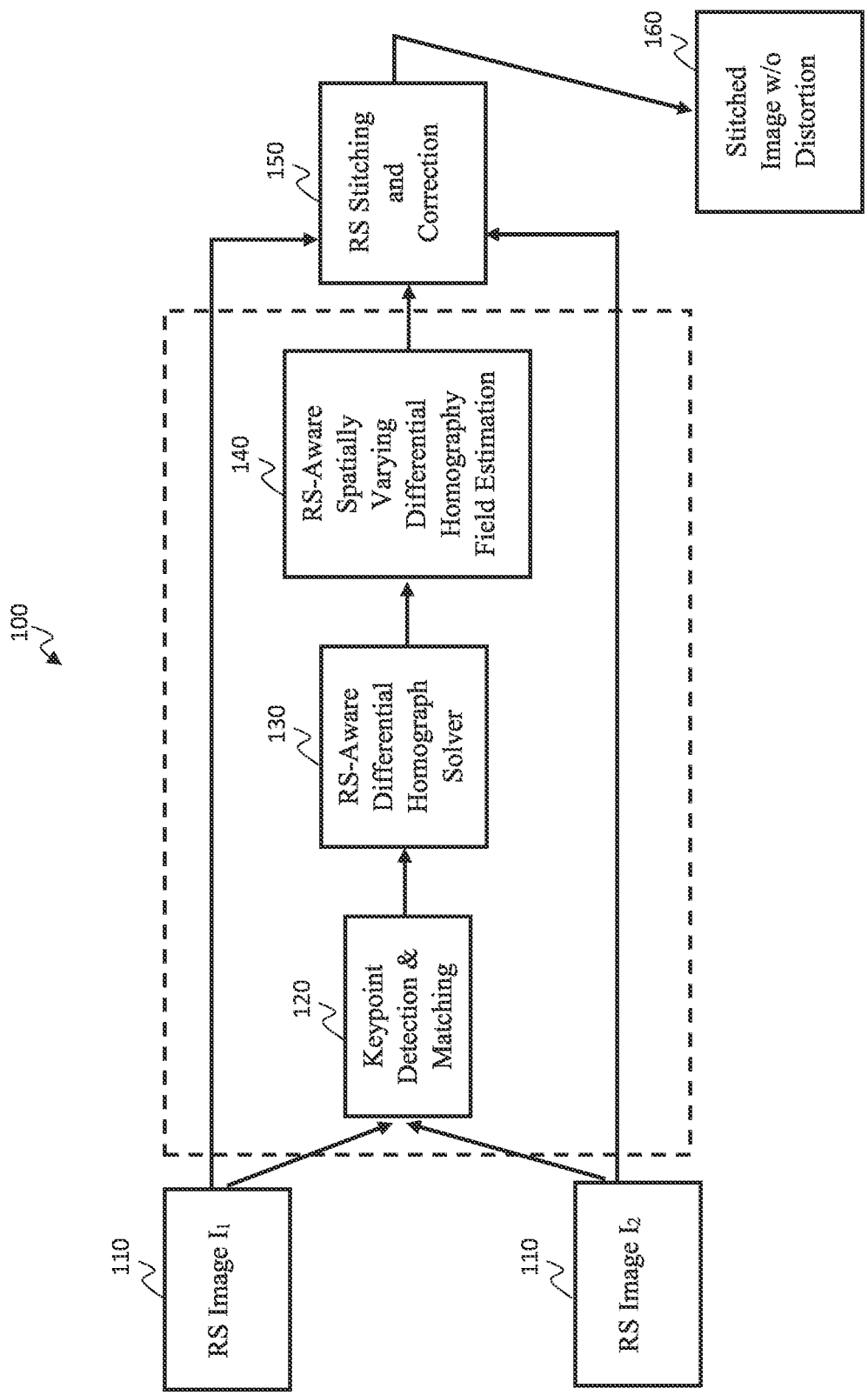
FIG. 1 is a block/flow diagram illustrating a rolling shutter (RS) correction and stitching framework, in accordance with embodiments of the present invention.

Rolling Shutter (RS) cameras adopt complementary metal oxide semiconductor (CMOS) sensors due to their low cost and simplicity in manufacturing. This stands in contrast to Global Shutter (GS) charge-coupled device (CCD) cameras that require specialized and highly dedicated fabrication. Such discrepancy provides RS cameras with a great advantage for ubiquitous employment in consumer products, e.g., smartphone cameras or dashboard cameras. However, the expediency in fabrication also causes an issue in image capture. Instead of capturing different scanlines all at once as in GS cameras, RS cameras expose each scanline one by one sequentially from top to bottom. While static RS camera capturing a static scene is fine, the RS effect is unacceptable as soon as images are taken during motion, e.g., images could be distorted due to scanline-varying camera poses.

RS distortion has thus been causing issues in various computer vision tasks. There is constant pressure to either remove the RS distortion in the front-end image capture or design task-dependent RS-aware algorithms in the back end. While various algorithms have been developed for each of them in isolation, algorithms achieving both in a holistic way are few and far between. The exemplary embodiments of the present invention introduce differential homography and demonstrate its application to carry out RS image stitching and rectification at one stroke.

RS effects complicate the two-view geometry significantly compared to their GS counterparts, primarily because 12 additional unknown parameters are required to model the intra-frame velocity of the two cameras. Thus, despite the recent efforts in solving a generic RS homography for discrete motion, the complexity of RS geometry significantly increases the number of required correspondences (e.g., 36 points for full model and 13.5 points after a series of approximations). The exemplary embodiments focus on the special, yet common case, where the inputs are two consecutive frames from a video stream of an RS camera. In this case, the inter-frame motion is restricted from being arbitrarily large, allowing the exemplary methods to adopt the simpler differential homography model. Furthermore, the intra-frame motion could be directly parameterized by the inter-frame motion via interpolation, thereby reducing the total number of unknown parameters to solve.

In particular, the exemplary embodiments derive an RS-aware differential homography under constant acceleration motion assumption, together with a straightforward solver requiring only 5 pairs of correspondences and demonstrates its application to simultaneous RS image stitching and rectification. Since a single homography warping is only exact under pure rotational camera motion or for 3D planar scene, it often causes misalignment when such a condition is not strictly met in practice.

To address such model inadequacy, the exemplary embodiments extend the single RS homography model to a spatially varying RS homography field following the As-Projective-As-Possible (APAP) principle, thereby lending itself to handling complex scenes. Thus, multiple images are stitched and rectified by concatenating pairwise warping in accordance with the exemplary method.

Conventional techniques compute the rectification for each pixel separately via pixel-wise depth estimation from optical flow and camera pose. As such, potential errors in optical flow estimates could lead to severe artifacts in the texture-less or non-overlapping regions. In contrast, the more parsimonious homography model offers a natural defense against wrong correspondences. Despite its lack of full 3D reconstruction, the exemplary embodiments observe good empirical performance in terms of visual appearance.

In summary, the exemplary embodiments derive a differential homography model together with a minimal solver to account for the scanline-varying camera poses of RS cameras. The exemplary embodiments introduce an RS-aware spatially varying homography field for improving RS image stitching. The proposed framework outperforms conventional methods both in RS image rectification and stitching.

Regarding GS discrete homography, it is assumed that two calibrated cameras are observing a 3D plane parameterized as (n, d), with n denoting the plane normal and d the camera-to-plane distance. Denoting the relative camera rotation and translation as $R \in SO(3)$ and $t \in \mathbb{R}^3$, a pair of 2D correspondences $x_1$ and $x_2$ (in normalized plane) can be related by $\hat{x}_2 \propto H\hat{x}_1$, where $H=R+tn^T/d$ is defined as the discrete homography and $\hat{x}=[x^T, 1]^T$. $\propto$ indicates equality up to a scale. Note that H in the above format subsumes the pure rotation-induced homography as a special case by letting $d \to \infty$. Each pair of correspondence $\{x_1^i, x_2^i\}$ gives two constraints $a_i h=0$, where $h \in \mathbb{R}^9$ is the vectorized form of H and the coefficients at $a_i \in \mathbb{R}^{2 \times 9}$ can be computed from $\{x_1^i, x_2^i\}$. In a GS discrete 4-point solver, with a minimum of 4 points, h can be solved as follows:

$$Ah=0, \ s.t. \|h\|=1,$$

which has a closed-form solution by Singular Value Decomposition (SVD). A is obtained by stacking all $a_i$.

Regarding the GS spatially varying discrete homography field, in an image stitching application, it is often safe to make a zero-parallax assumption as long as the (non-planar) scene is far enough. However, it is also not uncommon that such assumption is violated to the extent that warping with just one global homography causes unpleasant misalignments. To address this issue, APAP proposes to compute a spatially varying homography field for each pixel x:

$$h^*(x) = \arg\min_h \sum_{i \in I} \|\omega_i(x) a_i h\|^2, \ s.t. \ \|h\|=1,$$

where $$w_i(x) = \max\left(\exp\left(-\frac{\|x-x_i\|^2}{\sigma^2}\right), \tau\right)$$

is a weight.

$\sigma$ and $\tau$ are the pre-defined scale and regularization parameters, respectively. I indicates the inlier set returned from the GS discrete 4-point solver with RANSAC (Random Sample Consensus). The optimization has a closed-form solution by SVD. On the one hand, the above equation (spatially varying homography field for each pixel x) encourages the warping to be globally As-Projective-As-Possible (APAP) by making use of all the inlier correspondences, while, on the other hand, it allows local deformations guided by nearby correspondences to compensate for model deficiency. Such modification leads to considerable improvement in image stitching.

Regarding GS differential homography, it is assumed that the camera is undergoing an instantaneous motion, including rotational and translational velocity $(\omega, v)$. Then the camera induces a motion flow $u \in \mathbb{R}^2$ in each image point x. Denoting $\tilde{u}=[u^T, 0]^T$, the exemplary method obtains:

$$\tilde{u}=(I-\hat{x} e_3^T)H\hat{x}$$

where $H=-(\lfloor \omega \rfloor_x + vn^T/d)$ is defined as the differential homography.

I represents an identity matrix and $e_3=[0, 0, 1]^T$. $[\bullet]\times$ returns the corresponding skew-symmetric matrix from the vector. Each flow estimate $\{u_i, x_i\}$ gives two effective constraints out of the equations included in $\tilde{u}=(I-\hat{x} e_3^T)H\hat{x}$, denoted as $b_i h=u_i$, where $b_i \in \mathbb{R}^{2 \times 9}$ can be computed from $x_i$.

In the GS differential 4-point solver, with a minimal of 4 flow estimates, H can be computed by solving:

$$Bh=U,$$

which admits closed-form solution by pseudo inverse. B and U are obtained by stacking all $b_i$ and $u_i$, respectively. It is noted that only $H_L=H+\epsilon I$ can be recovered with an unknown scale $\epsilon$ because B has a one-dimensional null space. This can be seen by replacing H in $\tilde{u}=(I-\hat{x}\,e_3^T)H\hat{x}$, with $\varepsilon I$ and observing that the right-hand side vanishes, regardless of the value of x. $\varepsilon$ can be determined subsequently by utilizing the special structure of calibrated H. However, this is not relevant herein since the focus is on image stitching on general uncalibrated images.

Regarding RS motion parameterization, under the discrete motion model, in addition to the 6-Degree of Freedom (DoF) inter-frame relative motion (R, t), 12 additional unknown parameters $(\omega_1, v_1)$ and $(\omega_2, v_2)$ are needed to model the intra-frame camera velocity. This quickly increases the minimal number of points and the algorithm complexity to compute an RS-aware homography. Instead, the exemplary embodiments aim to solve it for the case of continuous motion, e.g., a relatively small motion between two consecutive frames. In this case, the exemplary methods only need to parameterize the relative motion $(\omega, v)$ between the two first scanlines (one can choose other reference scanlines without loss of generality) of the image pair, and the poses corresponding to all the other scanlines can be obtained by interpolation.

In particular, it is shown that a quadratic interpolation can be derived under constant acceleration motion. Formally, the absolute camera rotation and translation $(r_1^{y_1}, p_1^{y_1})$(resp. $(r_2^{y_2}, p_2^{y_2})$) of scanline $y_1$ (resp. $y_2$) in frame 1 (resp. 2) can be written as:

$$r_1^{y_1}=\beta_1(k,y_1)\omega,\; p_1^{y_1}=\beta_1(k,y_1)v$$

$$r_2^{y_2}=\beta_2(k,y_2)\omega,\; p_2^{y_2}=\beta_2(k,y_2)v$$

where $$\beta_1(k, y_1) = \left(\frac{\gamma y_1}{h} + \frac{1}{2}k\left(\frac{\gamma y_1}{h}\right)^2\right)\left(\frac{2}{2+k}\right),$$

$$\beta_2(k, y_2) = \left(1+\frac{\gamma y_2}{h} + \frac{1}{2}k\left(1+\frac{\gamma y_2}{h}\right)^2\right)\left(\frac{2}{2+k}\right).$$

Here, k is an extra unknown motion parameter describing the acceleration, which is assumed to be in the same direction as velocity. $\gamma$ denotes the readout time ratio, e.g., the ratio between the time for scanline readout and the total time between two frames (including inter-frame delay). h denotes the total number of scanlines in an image. Note that the absolute poses $(r_1^{y_1}, p_1^{y_1})$ and $(r_2^{y_2}, p_2^{y_2})$ are all defined with respect to the first scanline of frame 1. It follows that the relative pose between scanlines $y_i$ and $y_2$ reads:

$$\omega_{y_1 y_2}=r_2^{y_2}-r_1^{y_1}=(\beta_2(k,y_2)-\beta_1(k,y_1))\omega,$$

$$v_{y_1 y_2}=p_2^{y_2}-p_1^{y_1}=(\beta_2(k,y_2)-\beta_1(k,y_1))v.$$

Regarding the RS-aware differential homography, first, it is straightforward to verify that $\tilde{u}=(I-\hat{x}\,e_3^T)H\hat{x}$ also applies to uncalibrated cameras, under which case $H=-K(\lfloor\omega\rfloor_x+vn^T/d)K^{-1}$, with u and x being raw measurements in pixels. K denotes the unknown camera intrinsic matrix.

Given a pair of correspondence by $\{u,x\}$, the exemplary methods can plug $(\omega_{y_1 y_2}, v_{y_1 y_2})$ into $\tilde{u}=(I-\hat{x}\,e_3^T)H\hat{x}$, thus yielding:

$$\tilde{u}=(\beta_2(k,y_2)-\beta_1(k,y_1))(I-\hat{x}e_3^T)H\hat{x}=\beta(k,y_1,y_2)(I-\hat{x}e_3^T)H\hat{x}$$

$H_{RS}$ can be defined as: $H_{RS}=\beta(k, y_1, y_2)H$ as the RS-aware differential homography, which is now scanline dependent.

In addition to H, one more unknown parameter k needs to be solved. Below, the exemplary embodiments show that 5 pairs of correspondences are enough to solve for k and H, using the so-called hidden variable technique.

To get started, $\tilde{u}=(\beta_2(k,y_2)-\beta_1(k,y_1))(I-\hat{x}e_3^T)H\hat{x}=\beta(k,y_1,y_2)(I-\hat{x}e_3^T)H\hat{x}$ needs to be rewritten as:

$$\beta(k,y_1,y_2)bh=u$$

Next, u is moved to the left-hand side and the constraints from 5 points are stacked, thus leading to:

$$C\hat{h}=0,\text{ where}$$

$$C = \begin{bmatrix} \beta_1(k, y_1^1, y_2^1)b_1, & -u_1 \\ \beta_2(k, y_1^2, y_2^2)b_2, & -u_2 \\ \beta_3(k, y_1^3, y_2^3)b_3, & -u_3 \\ \beta_4(k, y_1^4, y_2^4)b_4, & -u_4 \\ \beta_5(k, y_1^5, y_2^5)b_5, & -u_5 \end{bmatrix}, \hat{h} = [h^T, 1]^T.$$

It is now clear that, for h to have a solution, C must be rank-deficient. Further observing that $C\in\mathbb{R}^{10\times 10}$ is a square matrix, rank deficiency indicates vanishing determinate, e.g., $\det(C)=0$.

This gives a univariable polynomial equation, whereby the exemplary methods can solve for k efficiently. h can subsequently be extracted from the null space of C.

Regarding Degree of Freedom (DoF) analysis, only 4.5 points are required in the minimal case, since one extra unknown k is present while each point gives two constraints. Utilizing 5 points nevertheless leads to a straightforward solution as shown. Yet, does this lead to an over-constrained system? The answer is no because the exemplary methods can only recover $H+\varepsilon I$ up to an arbitrary $\varepsilon$. Here, due to the one extra constraint, a specific value is chosen for $\varepsilon$ since the last element of $\hat{h}$ is set to 1. Note that a true $\varepsilon$, thus H, is not required in such context since it does not affect the warping. This is in contrast to uncalibrated Structure-from-Motion (SfM) where a projective reconstruction up to an arbitrary projective transformation is not inferior to the Euclidean reconstruction in terms of reprojection error.

Regarding plane parameters, the plane parameters slightly vary as well due to the intra-frame motion. This is however not explicitly modeled in $\hat{u}=(\beta_2(k,y_2)-\beta_1(k,y_1))(I-\hat{x}e_3^T)H\hat{x}=\beta(k,y_1,y_2)(I-\hat{x}e_3^T)H\hat{x}$, due to two reasons. First, although the intra-frame motion is in a similar range as the inter-frame motion and hence has a large impact in terms of motion, it induces merely a small perturbation to the absolute value of the scene parameters, which can be safely ignored. Second, the exemplary methods would like to keep the solver as simple as possible to obtain acceptable empirical results.

Regarding motion infidelity versus shutter fidelity, it is noted that the differential motion model is always an approximation specially designed for small motion. This means that, unlike its discrete counterpart, its fidelity decreases with increasing motion. Yet, the exemplary methods are only interested in relatively large motion such that the RS distortion reaches the level of being visually unpleasant. Therefore, a natural question to ask is, whether the benefits from modeling RS distortion (Shutter Fidelity) are more than enough to compensate for the sacrifices due to the approximation in motion model (Motion Infidelity). It is observed that the differential RS model achieves overwhelming dominance in this competition.

Regarding degeneracy, are there different pairs of k and H that lead to the same flow field u? Although such degeneracy does not affect stitching, it does make a difference to rectification. It is noted that such cases are very rare. Firstly, note that although {u, x} is usually collected from optical flow prior to the advent of keypoint descriptors, the exemplary embodiments choose the latter for image stitching for higher efficiency. Secondly, if k=0, e.g., constant velocity model, (ω, v) could be solved using a linear 4-point minimal solver similar to the GS case. However, it was determined to have inferior performance compared to the constant acceleration model in shaking cameras. Moreover, another question is whether GS APAP can handle RS distortion by itself.

As aforementioned, the adaptive weight in APAP is, e.g., $$h^*(x) = \arg\min_h \sum_{i \in I} \|\omega_i(x) a_i h\|^2, \text{ s.t. } \|h\| = 1,$$

Which permits local deformations to account for the local discrepancy from the global model. However, it can be argued that APAP alone is still not capable of handling RS distortion. The root cause lies in the GS homography being used, although the warping of pixels near correspondences are less affected, due to the anchor points role of correspondences, the warping of other pixels still relies on the transformation propagated from the correspondences, and, thus, the model being used does matter.

Regarding RS-aware APAP, obtaining a set of inlier correspondences I from the RS differential 5-point solver with RANSAC, the exemplary methods formulate the spatially varying RS-aware homography field as:

$$h^*(x) = \arg\min_h \sum_{k \in I} \|\omega_i(x)(\beta(k, y_1, y_2) b_i h - u_i)\|^2,$$

where $\omega_i(x)$ is defined as $$w_i(x) = \max\left(\exp\left(-\frac{\|x - x_i\|^2}{\sigma^2}\right), \tau\right).$$

Since k is a pure motion parameter independent of the scene, it remains fixed in this stage for simplicity. A normalization strategy is applied to (u, x) for numerical stability. The optimization has a simple closed-form solution, yet is geometrically meaningful in the sense that it minimizes the error between the estimated and the observed flow u. This stands in contrast with the discrete homography for which minimizing reprojection error requires nonlinear iterative optimization. In addition, it is also observed that higher stability from the differential model is achieved in cases of keypoints concentrating in a small region.

Regarding RS image stitching and rectification, once the homography H is had (either a global one or a spatially varying field) mapping from frame 1 to frame 2, the exemplary methods can warp between two images for stitching.

Referring to $\tilde{u} = ((\beta_2(k, y_2) - \beta_1(k, y_1))(I - \hat{x}e_3^T)H\hat{x} = \beta(k, y_1, y_2)(I - \hat{x}e_3^T)H\hat{x}$, for each pixel $x_1 = [x_1, y_1]^T$ in frame 1, its mapping $x_2$ $[x_2, y_2]^T$ is found in frame 2 by first solving for $y_2$ as:

$$y_2 = y_1 + \lfloor (\beta_2(k,y_2) - \beta_1(k,y_1))(I - \hat{x}e_3^T)H\hat{x}\rfloor_y$$

which admits a closed-form solution. $\lfloor \cdot \rfloor_y$ indicates taking the y coordinate. $x_2$ can be then obtained easily with known $y_2$. Similarly, $x_1$ could also be projected to the GS canvas defined by the pose corresponding to the first scanline of frame 1, yielding its rectified point $x_{g1}$.

$x_{g1}$ can be solved according to:

$$x_1 = x_{g1} + \lfloor (\beta_1(k,y_1))(I - \hat{x}_{g1}e_3^T)H\hat{x}_{g1}\rfloor_{xy}$$

where $\lfloor \cdot \rfloor_{xy}$ indicates taking x and y coordinate.

In summary, the exemplary embodiments derive a new differential homography that can account for the scanline-varying camera poses in RS cameras and illustrate that differential homography can be applied to carry out RS-aware image stitching and rectification at one stroke. Despite the high complexity of RS geometry, the exemplary methods focus on a special yet common input, that is, two consecutive frames from a video stream, wherein the inter-frame motion is restricted from being arbitrarily large. This permits the adoption of the simpler differential motion model, leading to straightforward minimal solvers under a mild motion assumption. Such simplicity also allows the exemplary methods to extend the single homography to a spatially varying homography field in the principle of as-projective-as-possible (APAP), which further improves the image stitching. The exemplary methods illustrate significantly superior performance over conventional methods in terms of both image stitching and rectification, especially for images captured by strongly shaking RS cameras.

The exemplary embodiments further develop a RS-aware differential homography with two frames as input. The exemplary embodiments focus on a special, yet practical case, where the input is two consecutive frames from a video stream. Under this case, the inter-frame motion is restricted from being arbitrarily large, allowing the exemplary methods to adopt a simpler differential homography model. Furthermore, the intra-frame motion can be directly interpolated from the inter-frame motion according to a mild motion assumption, thus immediately reducing unknown parameters. In particular, the exemplary methods derive an RS-aware differential homography under a constant acceleration motion assumption, together with a straightforward 5-point solver, and demonstrate its application to simultaneous image stitching and rectification. Since a single homography warping is only exact under pure rotational camera motion or for a 3D planar scene, which is often not strictly met in practice and causes misalignment. In particular, the exemplary methods extend the single RS homography to a spatially varying RS homography field following the APAP principle, further improving stitching performance.

FIG. 1 is a block/flow diagram 100 illustrating a rolling shutter (RS) correction and stitching framework, in accordance with embodiments of the present invention.

Two RS images (denoted as $f_1$ and $f_2$) 110 are given as input. Keypoint detection and matching component 120 extracts correspondences between $f_1$ and $f_2$, which are fed to the RS-aware differential homography estimation component 130 to filter out outlier correspondences. The inlier correspondences are then provided to the RS-aware spatially varying differential homography field estimation component 140. The RS-aware spatially varying differential homography field is then used for RS correction and stitching 150, producing stitched images 160 with distortion removed.

Elements 110 pertain to the input RS images which include RS distortions.

Given two RS images 110, denoted as $f_1$ and $f_2$, from a consecutive video as input, the exemplary methods extract keypoints from both images and perform feature matching to find correspondences. $\{x_i, x_i + u_i\}$ is denoted with i=1, 2, ..., N as the set of correspondences extracted between the two images 110, where $x_i$ and $x_i + u_i$ are respectively the i-th keypoint position on $f_1$ and its corresponding kepoing position on $f_2$ respectively, $u_i$ denotes the displacement vector, i.e. motion flow, between the two keypoints, and N is the number of correspondences.

Component 120 is the keypoint detection and matching component that extracts keypoints and matches them across the input RS images 110 (e.g., any sparse/dense/hand-crafted/learned keypoint detection and matching method).

Component 130 employs a robust estimation (e.g., RANSAC) with the proposed RS-aware differential homography model to filter out outlier correspondences.

The extracted correspondences are passed to the RS-aware differential homography solver 130 with RANSAC to select inlier correspondences. The exemplary methods denote the relative rotation and translation between the camera poses corresponding to the first scanline in $f_1$ and $f_2$ as $(\omega, v)$, $\omega \in so(3)$, $t \in R^3$.

Component 140 is an RS-aware spatially varying differential homography field estimation component that computes the proposed RS-aware spatially varying differential homography field.

In an image stitching application, it is often safe to make a zero-parallax assumption as long as the (non-planar) scene is far enough. However, it is also not uncommon that such assumption is violated to the extent that warping with just one global homography causes unpleasant misalignments. To address this issue, the exemplary methods follow APAP to compute a spatially varying homography field for each pixel x:

$$h^*(x) = \arg\min_h \sum_{i \in I} \|w_i(x)a_i h\|^2, \text{ s.t. } \|h\| = 1,$$

where $$w_i(x) = \max\left(\exp\left(-\frac{\|x - x_i\|^2}{\sigma^2}\right), \tau\right)$$

is a weight.

Component 150 is the RS correction and stitching component that takes the input RS images 110 ($f_1$ and $f_2$) and the estimated RS-aware spatially varying differential homography field (e.g., it is assumed that it warps from $f_1$ and $f_2$) to perform RS correction and stitching.

Once the RS-aware homography mapping from frame 1 to frame 2 is obtained, the exemplary methods can warp between two images for stitching as well as removing the distortion. For each pixel $x_1=[x_1, y_1]^\tau$ in frame 1, the exemplary methods find its mapping $x_2=[x_2, y_2]^\tau$ in frame 2 by first solving for $y_2$ as noted above.

The output result is the stitched image 160 without RS distortion.

Figure 2:
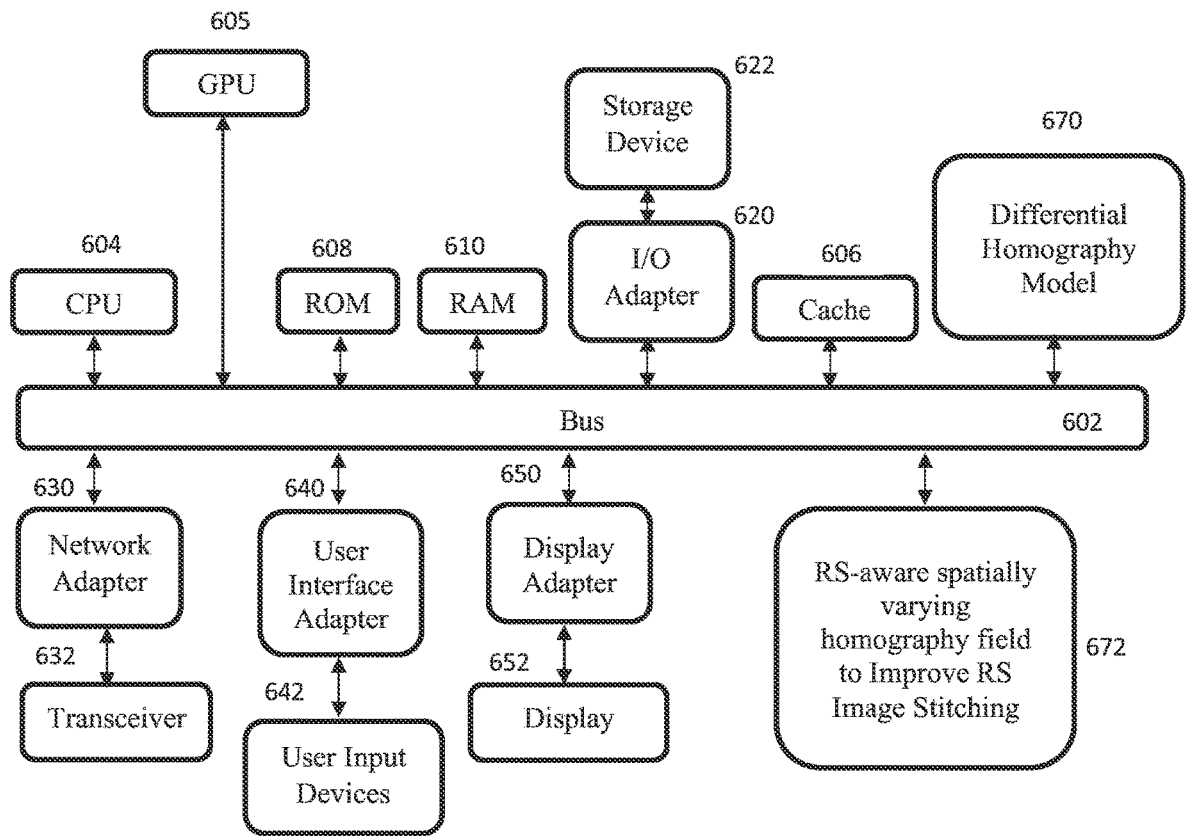
FIG. 2 is an exemplary processing system for RS correction and stitching, in accordance with embodiments of the present invention.

FIG. 2 is an exemplary processing system for RS correction and stitching, in accordance with embodiments of the present invention.

The processing system includes at least one processor (CPU) 604 operatively coupled to other components via a system bus 602. A GPU 605, a cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, differential homography model 670 can be employed for applying rolling shutter (RS)-aware spatially varying differential homography fields for simultaneous RS distortion removal and image stitching 672. The differential homography model 670 can employ an RS-aware spatially varying homography field to improve RS image stitching and correction.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 3:
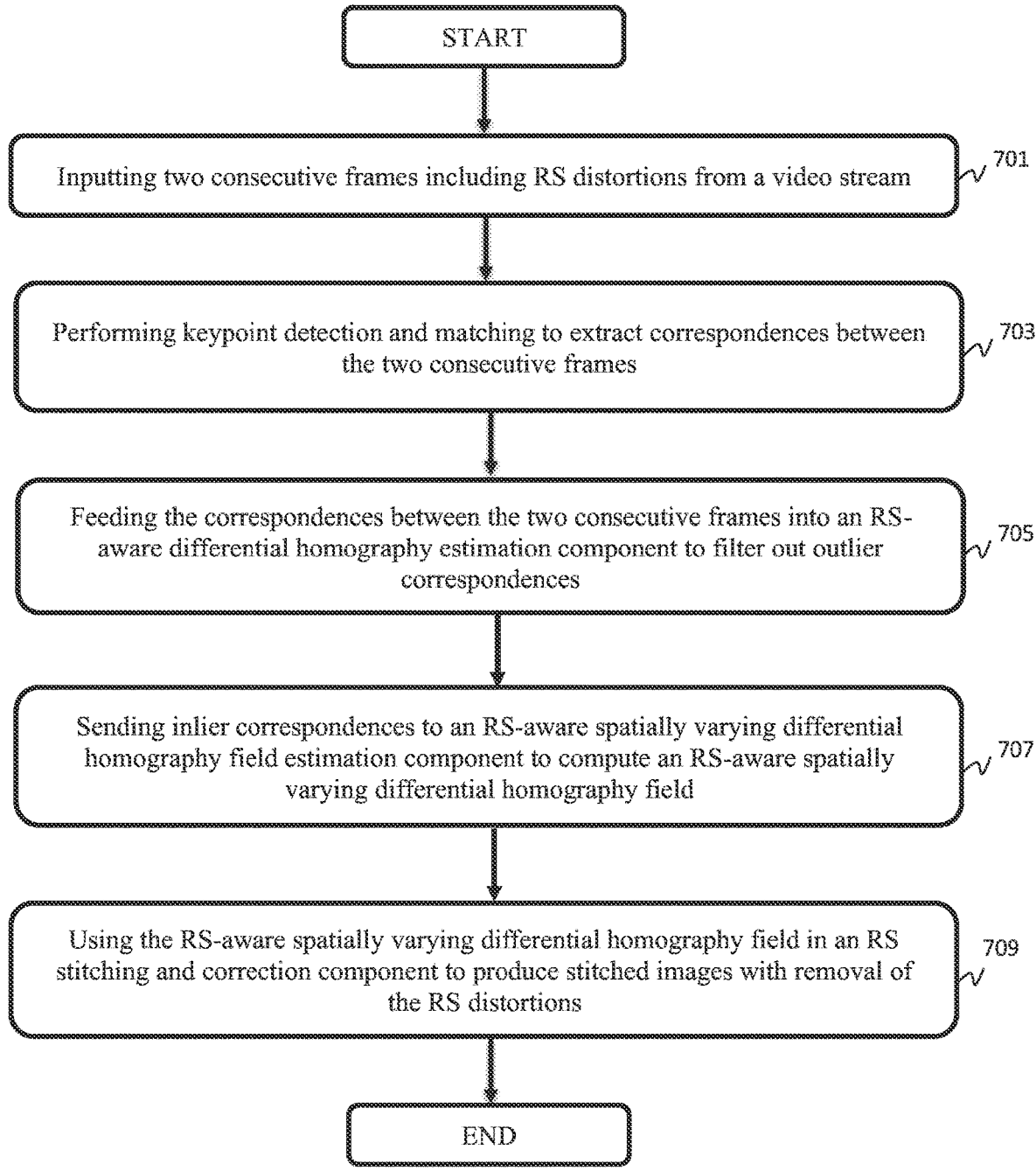
FIG. 3 is a block/flow diagram of a method for RS correction and stitching, in accordance with embodiments of the present invention.

FIG. 3 is a block/flow diagram of a method for RS correction and stitching, in accordance with embodiments of the present invention.

At block 701, input two consecutive frames including RS distortions from a video stream.

At block 703, perform keypoint detection and matching to extract correspondences between the two consecutive frames.

At block 705, feed the correspondences between the two consecutive frames into an RS-aware differential homography estimation component to filter out outlier correspondences.

At block 707, send inlier correspondences to an RS-aware spatially varying differential homography field estimation component to compute an RS-aware spatially varying differential homography field.

At block 709, use the RS-aware spatially varying differential homography field in an RS stitching and correction component to produce stitched images with removal of the RS distortions.

Figure 4:
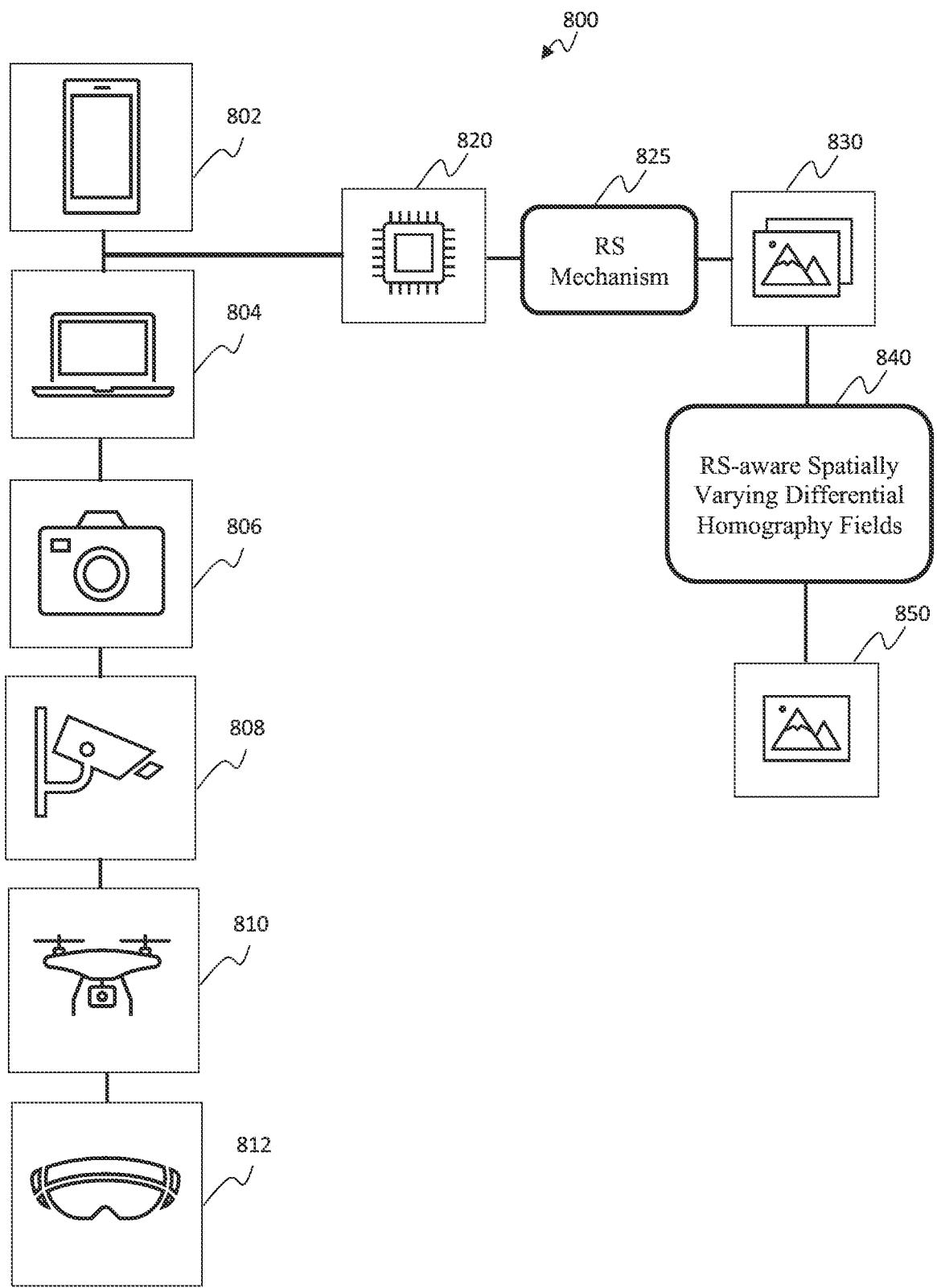
FIG. 4 is a block/flow diagram of practical applications for RS correction and stitching, in accordance with embodiments of the present invention.

FIG. 4 is a block/flow diagram 800 of practical applications for RS correction and stitching, in accordance with embodiments of the present invention.

Mobile phones 802, tablets 804, cameras 806, 808, drones 810, and smart glasses 812, no name a few electronic devices, employ CMOS imaging sensors 820, which capture images under the RS mechanism 825. The captured images 830 can include distortions. However, by applying the RS-aware spatially varying differential homography fields system 840 of the present invention, images 850 with no distortion can be obtained.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for applying rolling shutter (RS)-aware spatially varying differential homography fields for simultaneous RS distortion removal and image stitching, the method comprising:
   inputting two consecutive frames including RS distortions from a video stream;
   performing keypoint detection and matching to extract correspondences between the two consecutive frames;
   feeding the correspondences between the two consecutive frames into an RS-aware differential homography estimation component to filter out outlier correspondences;
   sending inlier correspondences to an RS-aware spatially varying differential homography field estimation component to compute an RS-aware spatially varying differential homography field; and
   using the RS-aware spatially varying differential homography field in an RS stitching and correction component to produce stitched images with removal of the RS distortions.

2. The method of claim 1, wherein the outlier correspondences are filtered out by employing robust estimation with the RS-aware differential homography estimation component and remaining inlier correspondences are sent to the RS-aware spatially varying differential homography estimation component.

3. The method of claim 1, wherein the RS-aware spatially varying differential homography field is derived under a constant acceleration motion assumption regarding an RS camera capturing the video stream.

4. The method of claim 1, wherein a minimal solver is applied to account for scanline varying camera poses of an RS camera capturing the video stream.

5. The method of claim 1, wherein a relative motion between two first scanlines of the two consecutive frames are parameterized.

6. The method of claim 5, wherein poses corresponding to all other scanlines are obtained by interpolation.

7. The method of claim 1, wherein the RS-aware spatially varying differential homography field is given as:

$$h^*(x) = \arg\min_h \sum_{k \in I} \|w_i(x)(\beta(k, y_1, y_2)b_i h - u_i)\|^2,$$

where $w_i(x)$ is defined as $$w_i(x) = \max\left(\exp\left(-\frac{\|x - x_i\|^2}{\sigma^2}\right), \tau\right),$$

$\sigma$ and $\tau$ are pre-defined scale and regularization parameters, k is a pure motion parameter independent of a scene, $b_i$ and $u_i$ are constraints, x is an image point, $y_1$, $y_2$ are scanlines, h is a total number of scanlines, and $\beta(k, y_1, y_2)$ is a scale describing a constant acceleration motion.

8. A system for applying rolling shutter (RS)-aware spatially varying differential homography fields for simultaneous RS distortion removal and image stitching, the system comprising:
   a memory; and
   a processor in communication with the memory, wherein the processor runs program code to:
      input two consecutive frames including RS distortions from a video stream;
      perform keypoint detection and matching to extract correspondences between the two consecutive frames;
      feed the correspondences between the two consecutive frames into an RS-aware differential homography estimation component to filter out outlier correspondences;
      send inlier correspondences to an RS-aware spatially varying differential homography field estimation component to compute an RS-aware spatially varying differential homography field; and
      use the RS-aware spatially varying differential homography field in an RS stitching and correction component to produce stitched images with removal of the RS distortions.

9. The system of claim 8, wherein the outlier correspondences are filtered out by employing robust estimation with the RS-aware differential homography estimation component and remaining inlier correspondences are sent to the RS-aware spatially varying differential homography estimation component.

10. The system of claim 8, wherein the RS-aware spatially varying differential homography field is derived under a constant acceleration motion assumption regarding an RS camera capturing the video stream.

11. The system of claim 8, wherein a minimal solver is applied to account for scanline varying camera poses of an RS camera capturing the video stream.

12. The system of claim 8, wherein a relative motion between two first scanlines of the two consecutive frames are parameterized.

13. The system of claim 12, wherein poses corresponding to all other scanlines are obtained by interpolation.

14. The system of claim 1, wherein the RS-aware spatially varying differential homography field is given as:

$$h^*(x) = \arg\min_h \sum_{k \in I} \|w_i(x)(\beta(k, y_1, y_2)b_i h - u_i)\|^2,$$

where $w_i(x)$ is defined as $$w_i(x) = \max\left(\exp\left(-\frac{\|x - x_i\|^2}{\sigma^2}\right), \tau\right),$$

$\sigma$ and $\tau$ are pre-defined scale and regularization parameters, k is a pure motion parameter independent of a scene, $b_i$ and $u_i$ are constraints, x is an image point, $y_1$, $y_2$ are scanlines, h is a total number of scanlines, and $\beta(k, y_1, y_2)$ is a scale describing the constant acceleration motion.

15. A non-transitory computer-readable storage medium comprising a computer-readable program for applying rolling shutter (RS)-aware spatially varying differential homography fields for simultaneous RS distortion removal and image stitching, wherein the computer-readable program when executed on a computer causes the computer to perform the steps of:
   inputting two consecutive frames including RS distortions from a video stream;
   performing keypoint detection and matching to extract correspondences between the two consecutive frames;

feeding the correspondences between the two consecutive frames into an RS-aware differential homography estimation component to filter out outlier correspondences;

sending inlier correspondences to an RS-aware spatially varying differential homography field estimation component to compute an RS-aware spatially varying differential homography field; and using the RS-aware spatially varying differential homography field in an RS stitching and correction component to produce stitched images with removal of the RS distortions.

16. The non-transitory computer-readable storage medium of claim 15, wherein the outlier correspondences are filtered out by employing robust estimation with the RS-aware differential homography estimation component and remaining inlier correspondences are sent to the RS-aware spatially varying differential homography estimation component.

17. The non-transitory computer-readable storage medium of claim 15, wherein the RS-aware spatially varying differential homography field is derived under a constant acceleration motion assumption regarding an RS camera capturing the video stream.

18. The non-transitory computer-readable storage medium of claim 15, wherein a minimal solver is applied to account for scanline varying camera poses of an RS camera capturing the video stream.

19. The non-transitory computer-readable storage medium of claim 15, wherein a relative motion between two first scanlines of the two consecutive frames are parameterized.

20. The non-transitory computer-readable storage medium of claim 19, wherein poses corresponding to all other scanlines are obtained by interpolation.

* * * * *